June 25, 1968

J. L. GOOD 3,389,726

STUMP PULVERIZING APPARATUS

Filed July 10, 1964

INVENTOR.
JACK L GOOD

BY
Kimmel & Crowell
ATTORNEYS.

INVENTOR.
JACK L GOOD
BY
Kimmel & Crowell
ATTORNEYS.

United States Patent Office 3,389,726
Patented June 25, 1968

3,389,726
STUMP PULVERIZING APPARATUS
Jack L. Good, Star Rte., Palestine, Ark. 72372
Filed July 10, 1964, Ser. No. 381,830
4 Claims. (Cl. 144—2)

This invention relates to a stump pulverizing apparatus and has as its primary object the provision of a device which will pulverize the tops of stumps remaining in the ground to a considerable distance below ground level, reducing the material thereof to fine particles or, in effect, saw dust, so as not to interfere with tilling the soil, cultivating, weeding, or other mechanical operations incident to farming.

A further object of the invention is the provision of a device of this character which is adapted to be attached to the power actuated lift bar of a tractor or the like so that the level of the device may be readily varied to destroy the upper portion of the stump to a desired distance beneath the ground, and correspondingly so that the entire device may be elevated for travel.

A further object of the invention resides in the provision of a device of this character which will destroy the upper portions of the stump to a depth of twelve inches below the ground if desired, a depth sufficient so that no interference with normal tillage of the soil is occasioned by the balance of the stump left in the ground.

A further object of the invention is the provision of a device of this character, which, by destroying the upper portion of the stump, eliminates the necessity of blasting, digging, and otherwise uprooting the entire stump, a procedure which is frequently expensive and time consuming, and which under ordinary circumstances is unnecessary, if the top portion of the stump is removed.

A further and more specific object of the invention resides in the provision of such a device incorporating a rotating drum provided with pulverizing teeth of a specific shape, constitution, and arrangement, which augments and amplifies their pulverizing effect.

A further and more specific object of the invention is the provision of such a drum provided with elongated teeth having concaved front faces, terminating in sharp points, the teeth themselves being constructed of hardened steel, and the tips being formed of carbide in order more effectively to pulverize hardwood stumps or the like.

Still other objects reside in the combinations of elements, arrangements of parts, and features of construction.

Other objects will in part be obvious and in part be pointed out hereinafter as the disclosure of the invention proceeds and shown in the accompanying drawings wherein there is shown a preferred embodiment of this inventive concept.

In the drawings.

Similar reference characters refer to similar parts throughout the several views of the drawing.

Figure 1:
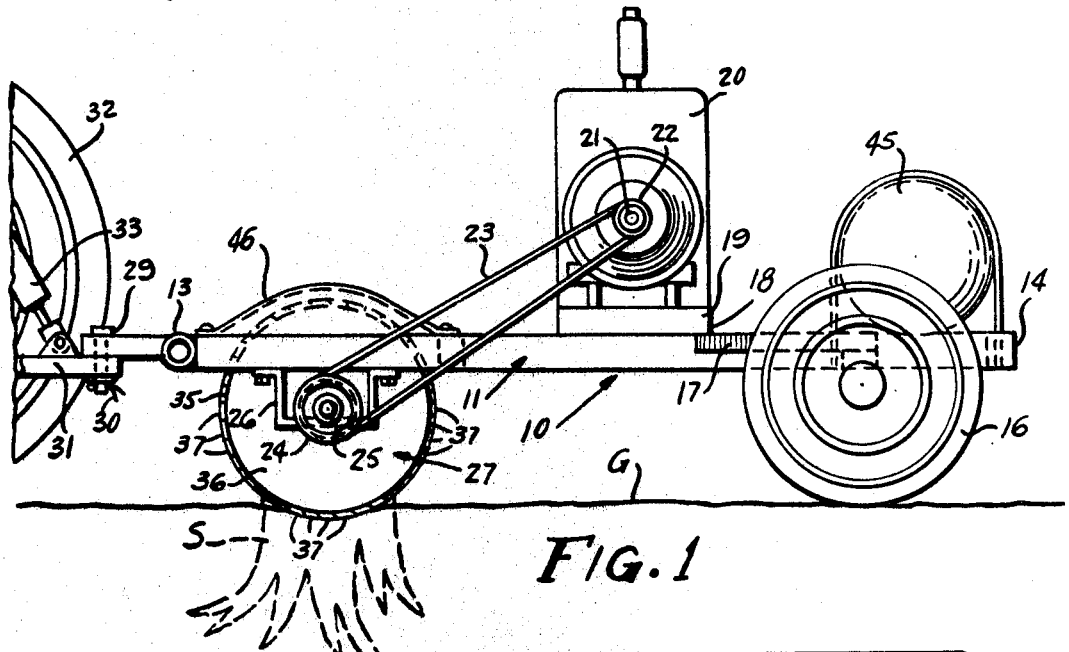
FIGURE 1 is a side elevational view of one form of device embodying features of the instant inventive concept, shown in operating position, a stump being indicated in dotted lines.
Figure 2:
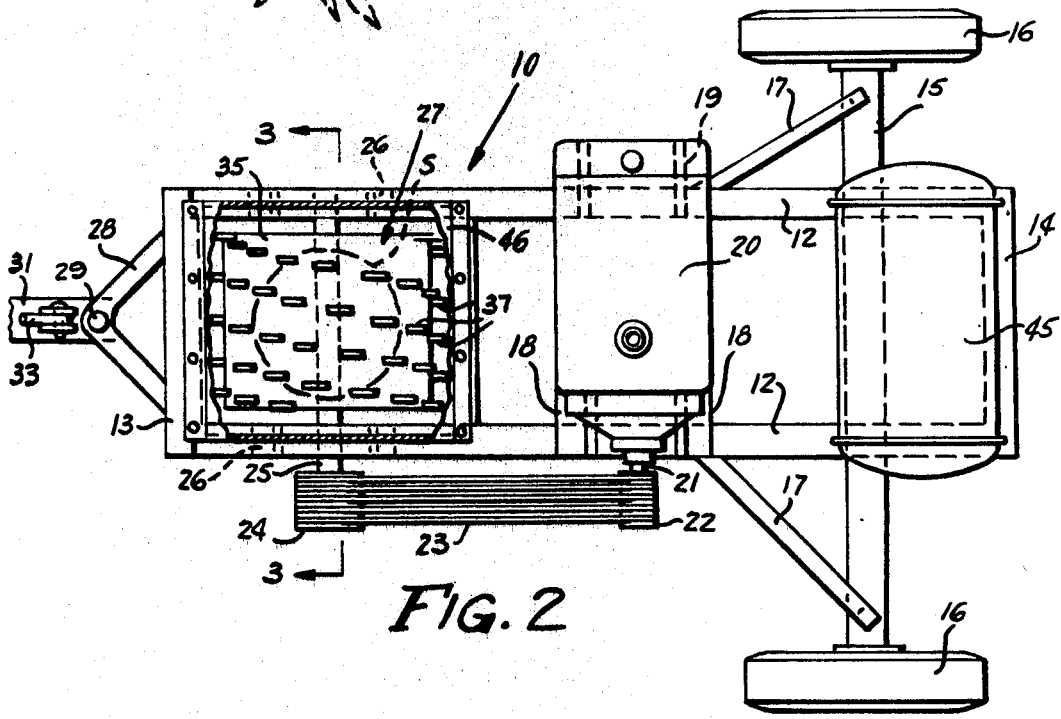
FIGURE 2 is a top plan view of the device of FIGURE 1, parts thereof being broken away.
Figure 3:
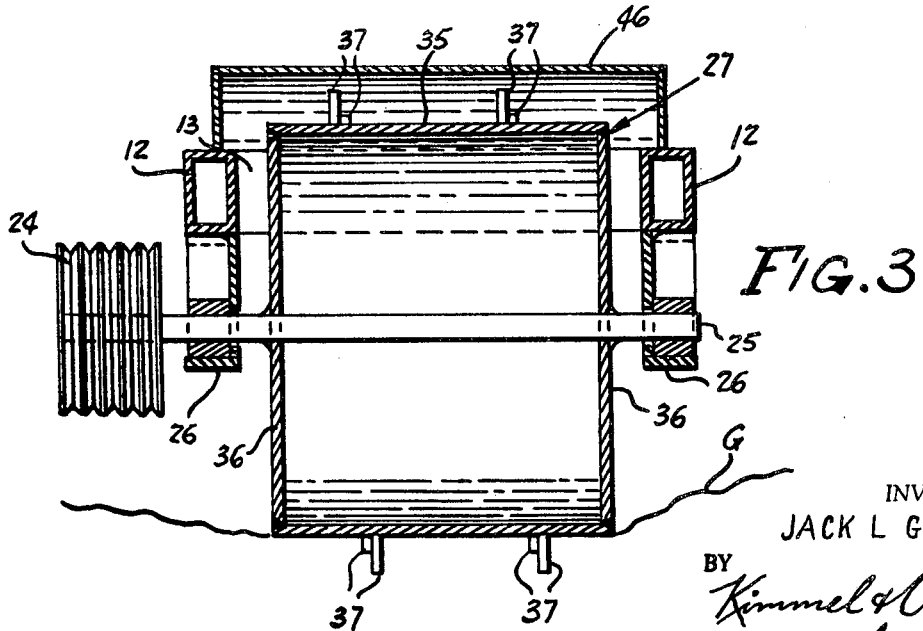
FIGURE 3 is an enlarged sectional view taken substantially along the line 3—3 of FIGURE 1 as viewed in the direction indicated by the arrows.

Having reference now to the drawings in detail, and more particularly to FIGURES 1, 2, and 3, there is generally indicated at 10 a stump pulverizer constructed in accordance with the instant invention, which includes a frame generally indicated at 11 comprised of a pair of spaced longitudinally extending channel irons 12 connected at their front and rear ends by cross members 13 and 14, respectively. An axle 15 is supported by the underside of the rear portion of the frame and carries at its extremities rubber tired wheels 16. Diagonal reinforcing braces are connected between the outer portions of the axle 15 and the side frame members 12. A pair of transversely extending channel irons 18 serve as supports for a plate 19, upon which is mounted an internal combustion engine 20, which includes a drive shaft 21, and a drive pulley 22.

Pulley 22 is connected by drive belts 23 to a pulley 24 which is mounted on the end of a drum axle 25 which is journalled in mounting brackets 26 bolted to the undersides of opposite frame members 12. The drum axle supports a rotary drum, generally indicated at 27, and to be described more fully hereinafter.

A draw bar 28 is connected to the forward frame member 13, and is suitably connected in any desired manner as by a bolt 29 and cotter pin 30 to the lift bar 31 of a conventional tractor, a fragment of which is indicated at 32. The lift bar 31 is raised by a suitable conventional hydraulic mechanism 33, so that the level of the frame 10 may be varied to lift the drum 27 free of the ground for transportation, or to permit it to extend a material distance below ground level indicated at G in FIGURE 1 to pulverize the top of a stump which is indicated at S in FIGURE 1.

Figure 4:
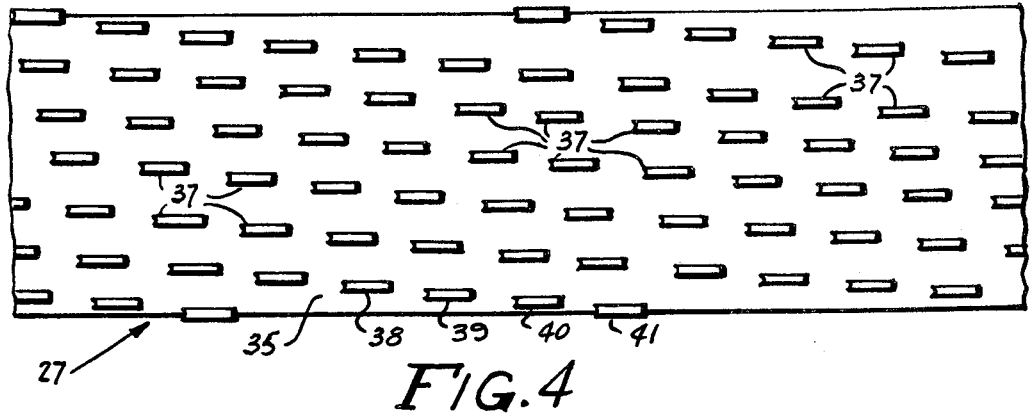
FIGURE 4 is a plan view of the drum and the teeth thereon, shown as flattened in order to more effectively disclose the arrangement of the teeth.
Figure 5:
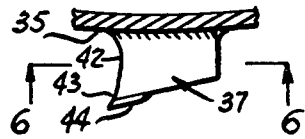
FIGURE 5 is an enlarged side elevational view of an individual tooth, a portion of the drum being shown in section.
Figure 7:
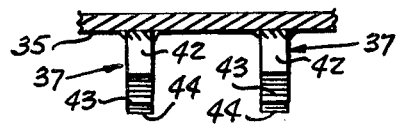
FIGURE 7 is a fragmentary view partially in elevation and partially in section showing the front faces of a pair of pulverizing teeth.
Figure 6:
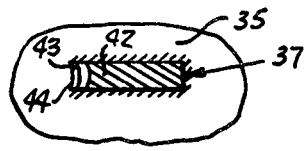
FIGURE 6 is a sectional view taken substantially along the line 6—6 of FIGURE 5 as viewed in the direction indicated by the arrows.

The drum 27 is comprised of a cylindrical side wall 35 and end plates 36, preferably of heavy metal, and may, if desired, be additionally weighted interiorly. A plurality of teeth 37 are provided on the surface of the drum, and are arranged, as best shown in FIGURE 4, in alternate rows 38 and 39, with the teeth of the alternate rows being offset relative to each other. The rows are arranged spirally about the peripheral wall 35 of the drum, so that a constant overlap of teeth is provided. The spacing of the teeth is such, as illustrated, that successive rows 38, 39, 40, and 41 have their teeth offset a relatively slight amount in comparison to the spacing of the teeth, so that a sequence of teeth follow each other and provide a continuous scoring surface across the top of a stump. The teeth, as best shown in FIGURE 5, are elongated and tapered longitudinally relative to the direction of rotation of the drum, and are each provided with a concaved working or cutting face 42, to provide a sharp point 43, which in turn is provided with a carbide tip 44. The teeth may be of any desired dimension, although a tooth two inches high, three-quarters of an inch wide, and approximately three inches long has been found to afford effective and complete pulverization of a hardwood stump when arranged in the manner indicated.

The frame preferably carries a fuel tank 45 which is suitably connected to the internal combustion engine 20, and a concavo-convex shield 46 may be positioned over the top of the drum if desired to protect the operator.

In the use and operation of the device the frame is first moved to a position overlying a stump S, and the lift arrangement 33 is actuated to lower the frame to a desired depth so that the drum rests on top of the stump. Rapid rotation of the drum effected by the internal combustion engine 20 and the drive belt 23 and its associated pulleys causes the carbide tips of teeth 37 to bite successively into the hard wood of the stump, the successive teeth rapidly and efficiently pulverizing the wood of the stump which is thus contacted, and reducing it to fine sawdust which may be readily removed. The weight of the drum will cause it to move downwardly, as the surface of the stump is reduced, in addition to which pressure afforded by the hydraulic lift mechanism may exert further force to the drum to assist in pulverizing the top of the stump.

From the foregoing it will now be seen that there is herein provided an improved stump pulverizing apparatus which accomplishes all of the objects of this invention, and others, including many advantages of great practical utility and commercial importance.

As many embodiments may be made of this inventive concept, and as many modifications may be made of the embodiment hereinbefore shown and described, it is to be understood that all matter herein is to be interpreted merely as illustrative, and not in a limiting sense.

I claim:

1. A stump pulverizing device comprising a wheeled frame, means adapted for attaching one end of said frame to the hydraulically actuated lift bar of a tractor, a rotatable stump pulverizing drum mounted transversely of the frame, power means carried by said frame for rotating said drum and pulverizing teeth on said drum, said teeth being elongated in the direction of rotation of said drum and provided with sharp points and concaved front stump impacting surfaces, the teeth being arranged in staggered rows with the teeth of one row offset relative to the teeth of an adjacent row, and arranged spirally relative to the axis of said drum.

2. The structure of claim 1 wherein the sharp points are formed at the outer extremities of the concaved faces.

3. The structure of claim 2 wherein the teeth are formed of hardened steel.

4. The structure of claim 3 wherein the sharp points of the teeth are provided with carbide tips.

References Cited

UNITED STATES PATENTS

| | | | |
|---|---|---|---|
| 1,278,629 | 9/1918 | Francis | 144—221 |
| 1,312,450 | 8/1919 | McKoy et al. | |
| 1,735,594 | 11/1929 | Anderson | 144—218 |
| 2,912,022 | 11/1959 | Ploeg et al. | |

WILLIAM W. DYER, Jr., *Primary Examiner.*

W. D. BRAY, *Assistant Examiner.*